United States Patent
Le et al.

(10) Patent No.: US 10,749,894 B2
(45) Date of Patent: Aug. 18, 2020

(54) PREFETCH INTRUSION DETECTION SYSTEM

(71) Applicant: Cisco Technology, Inc., San Jose, CA (US)

(72) Inventors: Meixing Le, Sunnyvale, CA (US); Jin Teng, Sunnyvale, CA (US); Soumya Kumar Kalahasti, Fremont, CA (US); Jianxin Wang, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 178 days.

(21) Appl. No.: 15/433,294

(22) Filed: Feb. 15, 2017

(65) Prior Publication Data
US 2018/0234453 A1   Aug. 16, 2018

(51) Int. Cl.
*H04L 29/06* (2006.01)
*H04L 29/08* (2006.01)
*G06N 20/00* (2019.01)

(52) U.S. Cl.
CPC ......... *H04L 63/1441* (2013.01); *G06N 20/00* (2019.01); *H04L 63/10* (2013.01); *H04L 69/22* (2013.01)

(58) Field of Classification Search
CPC ..... H04L 63/1441; H04L 67/02; H04L 63/10; G06N 5/04; G06N 99/005
See application file for complete search history.

(56) References Cited

U.S. PATENT DOCUMENTS

| | | | |
|---|---|---|---|
| 7,757,002 B2 | 7/2010 | Penton et al. | |
| 8,103,783 B2 | 1/2012 | Plamondon | |
| 8,938,488 B1* | 1/2015 | Sayed | H04L 9/0872 709/201 |
| 8,959,630 B2 | 2/2015 | Milener et al. | |
| 9,037,810 B2 | 5/2015 | Habusha et al. | |
| 2008/0215675 A1* | 9/2008 | Kaminitz | G06F 21/31 709/203 |
| 2009/0112975 A1* | 4/2009 | Beckman | H04L 67/26 709/203 |
| 2010/0031041 A1* | 2/2010 | Cohen | H04L 63/1441 713/168 |
| 2011/0103393 A1* | 5/2011 | Meier | H04L 12/66 370/401 |

(Continued)

FOREIGN PATENT DOCUMENTS

CN          103577756 A    2/2014

*Primary Examiner* — Meng Li
(74) *Attorney, Agent, or Firm* — Behmke Innovation Group LLC; Kenneth J. Heywood; Jonathon P. Western (57) ABSTRACT

In one embodiment, a device in a network generates a machine learning-based traffic model using data indicative of a particular node in the network attempting to retrieve content from a particular resource in the network. The device predicts, using the traffic model, a time at which the particular node is expected to attempt retrieving future content from the particular resource. The device causes the future content from the particular resource to be prefetched in the network prior to the predicted time. The device makes a security assessment of the prefetched content. The device causes performance of a mitigation action in the network based on the security assessment of the prefetched content and in response to the particular node attempting to retrieve the future content from the particular resource.

20 Claims, 7 Drawing Sheets

(56) References Cited

U.S. PATENT DOCUMENTS

| | | | |
|---|---|---|---|
| 2012/0084343 A1* | 4/2012 | Mir | H04L 29/12066 |
| | | | 709/203 |
| 2013/0055395 A1* | 2/2013 | Milener | G06F 21/51 |
| | | | 726/24 |
| 2015/0213259 A1* | 7/2015 | Du | H04L 63/1466 |
| | | | 726/27 |
| 2018/0091617 A1* | 3/2018 | Filiz | H04L 67/2847 |

* cited by examiner

PREFETCH INTRUSION DETECTION SYSTEM

TECHNICAL FIELD

The present disclosure relates generally to computer networks, and, more particularly, a prefetch intrusion detection system for a computer network.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

Beyond the various types of legitimate application traffic in a network, some network traffic may also be malicious. For example, some traffic may seek to overwhelm a service by sending a large number of requests to the service. Such attacks are also sometimes known as denial of service (DoS) attacks. Other forms of malicious traffic may seek to exfiltrate sensitive information from a network, such as credit card numbers, trade secrets, and the like. Typically, such traffic is generated by a client that has been infected with malware. Thus, further types of malicious network traffic include network traffic that propagate the malware itself and network traffic that passes control commands to already infected devices.

To further complicate the analysis of network traffic to discern between different types of traffic, the use of encryption is also steadily increasing. Notably, many websites are now using encryption, thereby protecting the payloads of their corresponding traffic from inspection. Malicious entities are also leveraging this fact to conceal malicious traffic using encryption.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network generates a machine learning-based traffic model using data indicative of a particular node in the network attempting to retrieve content from a particular resource in the network. The device predicts, using the traffic model, a time at which the particular node is expected to attempt retrieving future content from the particular resource. The device causes the future content from the particular resource to be prefetched in the network prior to the predicted time. The device makes a security assessment of the prefetched content. The device causes performance of a mitigation action in the network based on the security assessment of the prefetched content and in response to the particular node attempting to retrieve the future content from the particular resource.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
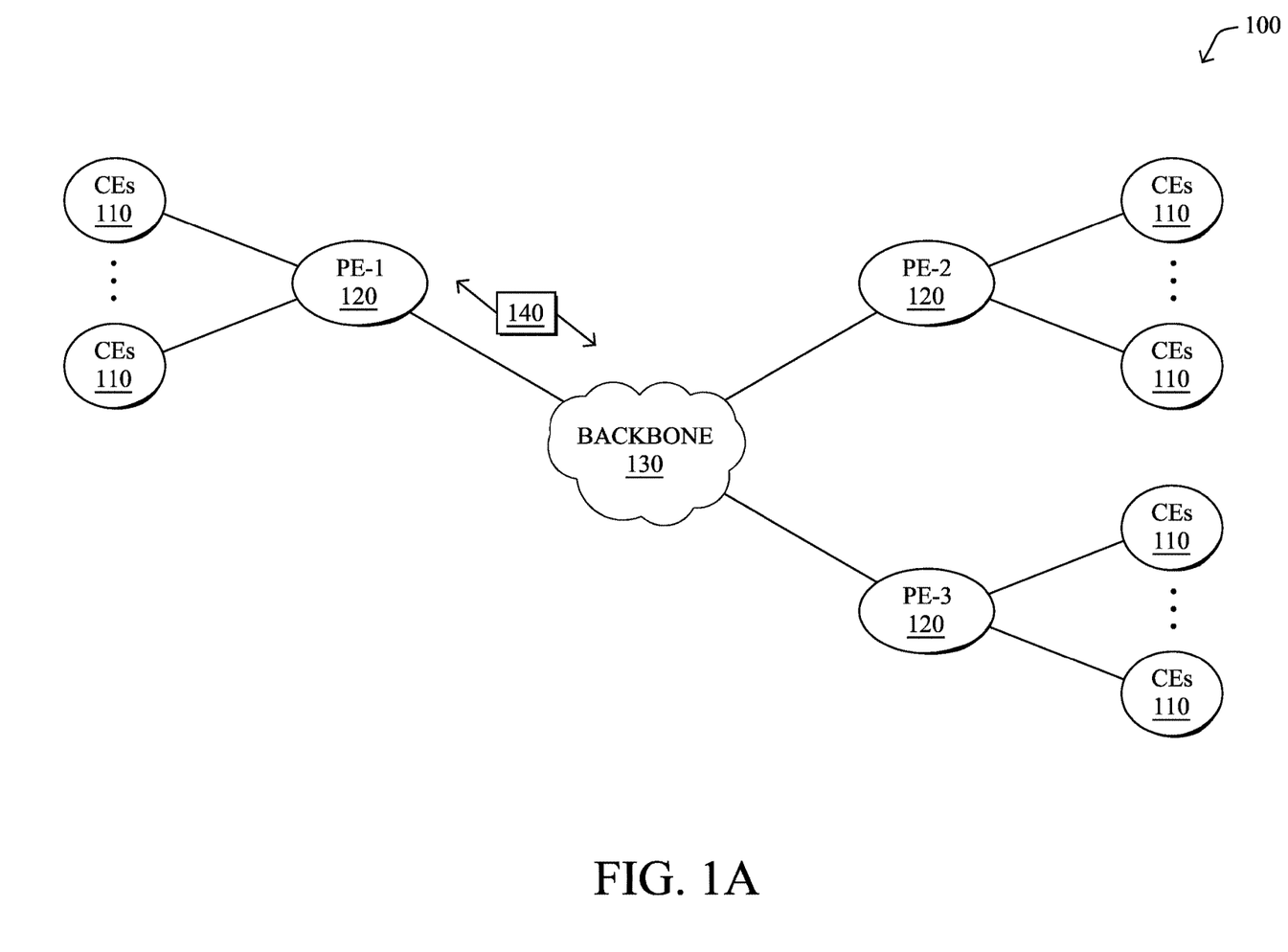
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
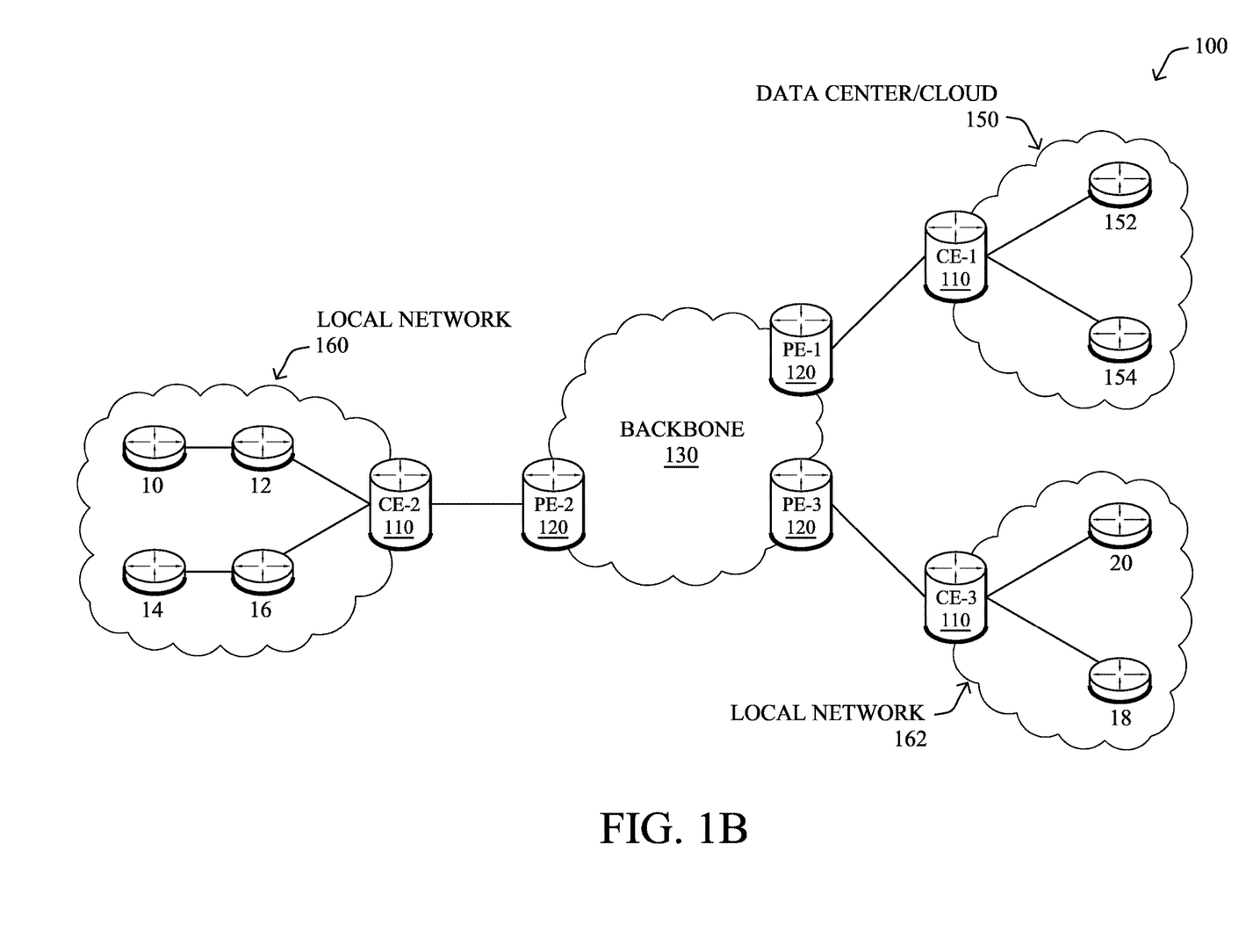

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, a webserver, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers.

In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
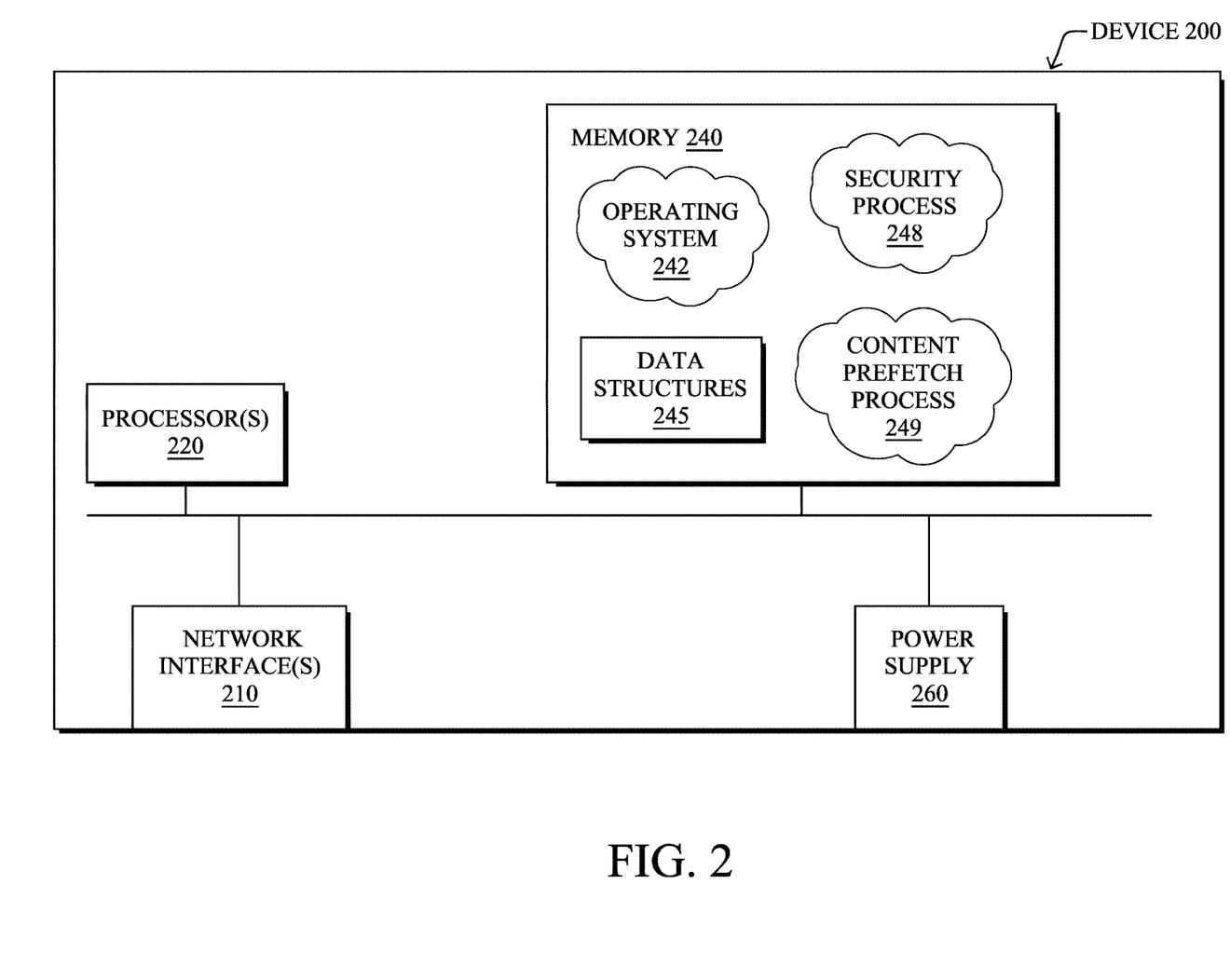
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a security process 248 and/or a content prefetch process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Security process 248 includes computer executable instructions that, when executed by processor(s) 220, cause device 200 to make a security assessment about a traffic flow or set of traffic flows, to discern the traffic flow type(s) under analysis. In some embodiments, security process 248 may discern between different types of benign traffic flows, such as the various benign applications associated with the flows that may be deployed in the network. In further embodiments, security process 248 may discern between benign and malicious traffic and may even identify the specific type of a malicious flow (e.g., the specific family of malware associated with the flow). For example, in the case of a webpage requested by a client node, security process 248 may inspect the content of the webpage and determine whether or not the content complies with a security policy.

Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, security process 248 may analyze traffic flow data to detect anomalous or otherwise undesirable behaviors (e.g., malfunctioning devices, misconfigured devices, etc.), traffic pattern changes (e.g., a group of hosts begin sending significantly more or less traffic), or the like.

According to various embodiments, security process 248 may employ any number of machine learning techniques, to assess a given traffic flow in the network. In general, machine learning is concerned with the design and the development of techniques that receive empirical data as input (e.g., traffic data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, security process 248 can use the model M to classify new data points, such as information regarding new traffic flows or content in the network. Often, M is a statistical model, and the cost function is inversely proportional to the likelihood of M, given the input data.

In various embodiments, security process 248 may employ one or more supervised, unsupervised, or semi-supervised machine learning models to analyze traffic flow data. Generally, supervised learning entails the use of a training dataset, which is used to train the model to apply labels to the input data. For example, the training data may include sample traffic data that is "normal," or "malware-related." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that security process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, autoregressive integrated moving average (ARIMA) models, other time series models, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, security process 248 may assess the captured traffic data on a per-flow basis. In other embodiments, security process 248 may assess traffic data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
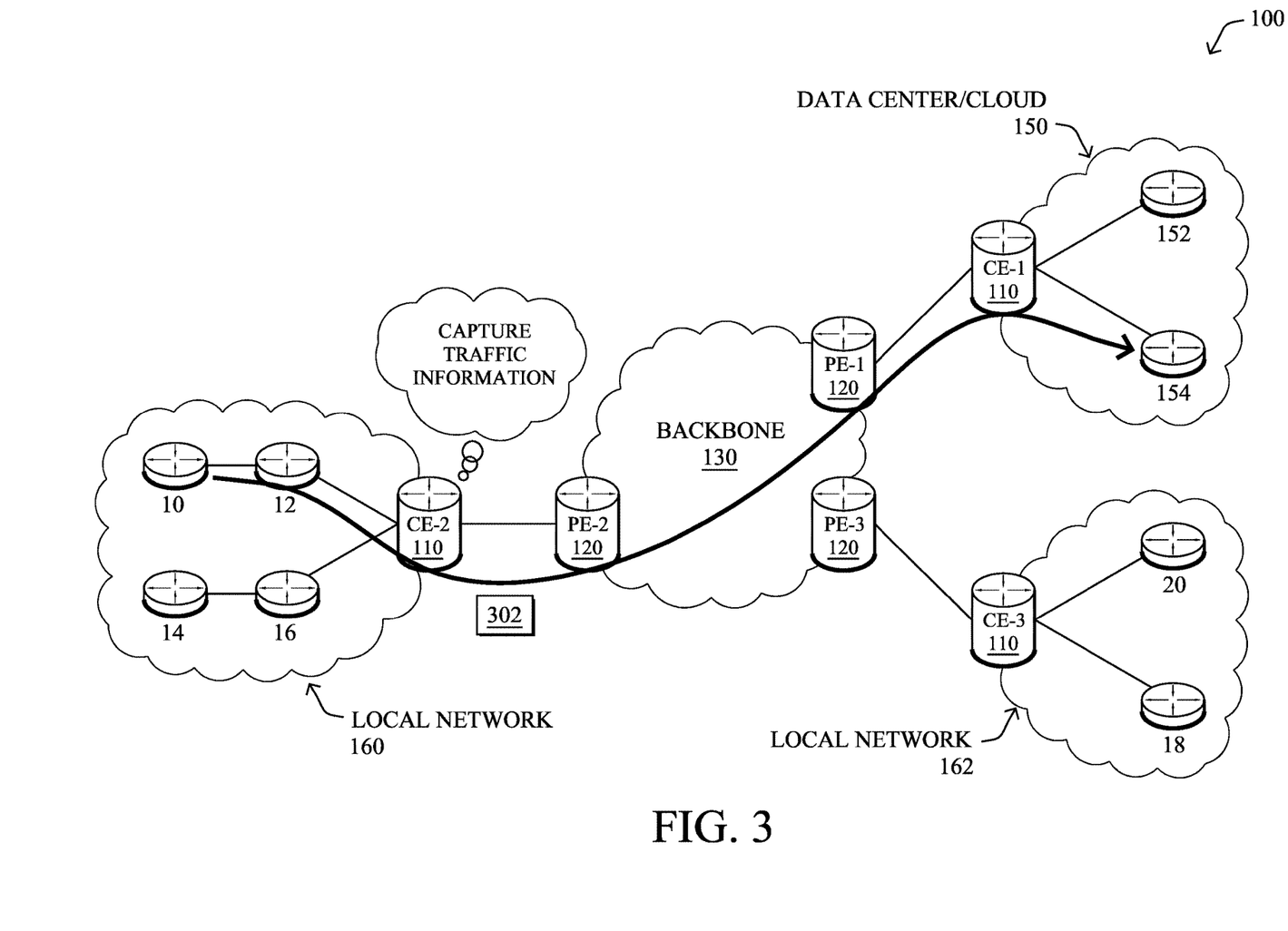
FIG. 3 illustrates an example of a network device capturing traffic data.

As shown in FIG. 3, various mechanisms can be leveraged to capture information about traffic in a network. For example, consider the case in which client node 10 initiates a traffic flow with remote server 154 that includes any number of packets 302. Any number of networking devices along the path of the flow may analyze and assess packet 302, to capture traffic data regarding the traffic flow. For example, as shown, consider the case of edge router CE-2 through which the traffic between node 10 and server 154 flows. While the packets 302 flow through edge router CE-2, router CE-2 may capture traffic data regarding the flow. Notably, traffic flows can be monitored in many cases through the use of a tap or Switch Port Analyzer (SPAN).

In some embodiments, a networking device may analyze packet headers, to capture information about the traffic flow. For example, router CE-2 may capture the source address and/or port of host node 10, the destination address and/or port of server 154, the protocol(s) used by packet 302, or other header information by analyzing the header of a packet 302. In further embodiments, the device may also assess the payload of the packet to capture information about the traffic flow. For example, router CE-2 or another intermediary device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the traffic data may also compute any number of statistics or metrics regarding the traffic flow. For example, CE-2 may determine the start time, end time, duration, packet size(s), the distribution of bytes within a flow, etc., associated with the traffic flow by observing packets 302.

In the specific case of encrypted traffic, the networking device that captures the traffic data may also be a proxy device, in some embodiments. For example, CE-2 or another intermediary device may act as a man-in-the-middle between endpoints, to intercept the encryption credentials used and simulate responses from each respective node. In doing so, the device may be able to decrypt and analyze the payloads of the packets. Alternatively, in further embodiments, the device may simply capture header information from encrypted traffic, such as Transport Layer Security (TLS) header information.

As noted above, an intermediary device such as a firewall, router, switch, intrusion detection system (IDS), intrusion protection system (IPS), or the like, may make security assessments of traffic flowing through the network. Example security assessments may include, but are not limited to, determining whether the content of a traffic flow is malicious, offensive, or otherwise prohibited or restricted from being accessed by a node or user in the network. Security assessments may also be on a per-user or per-node basis. For example, one user may be authorized to access certain content from a resource, while another user may be barred from access by policy. In addition, when the device determines that a traffic flow violates a security policy, the device may cause the performance of any number of mitigation actions in the network (e.g., blocking the traffic flow from reaching the local client node, generating an alert to the user or network administrator, etc.).

Typically, security assessments are made on the fly as the intermediary device encounters requested content. However, as network security requirements have evolved, so too have the number of operations that the device needs to perform with respect to a traffic flow. For example, the device may also need to decrypt the traffic, perform DPI on the contents, execute the content in a sandbox environment, and re-encrypt the traffic before sending the traffic on to the requesting client node. Thus, the intermediary device may experience constrained resources in cases of high traffic volumes. More importantly, if the device only performs traffic inspection when the traffic arrives at the device, zero day threats likely cannot be understood by the device, which commonly leads to the traffic being passed through and creating a security vulnerability.

Prefetch Intrusion Detection System

The techniques herein leverage machine learning to help a security device to predict and prefetch network content for inspection by a security device. In various aspects, the security device may use a machine learning-based traffic model to predict when a particular node in the network is expected to attempt to access content from a resource in the network, such as a webpage. In turn, the device may use this model to cause the content of the resource to be prefetched for inspection (e.g., before the node actually requests the content). As would be appreciated, this allows the device to reduce the amount of time needed to identify content of a zero day attack (e.g., using DPI and when the policy needs to be enforced.

Specifically, according to one or more embodiments of the disclosure as described in detail below, a device in a network generates a machine learning-based traffic model using data indicative of a particular node in the network attempting to retrieve content from a particular resource in the network. The device predicts, using the traffic model, a time at which the particular node is expected to attempt retrieving future content from the particular resource. The device causes the future content from the particular resource to be prefetched in the network prior to the predicted time. The device makes a security assessment of the prefetched content. The device causes performance of a mitigation action in the network based on the security assessment of the prefetched content and in response to the particular node attempting to retrieve the future content from the particular resource.

Illustratively, the techniques described herein may be performed by hardware, software, and/or firmware, such as in accordance with security process 248 and/or content prefetch process 249, which may include computer executable instructions executed by the processor 220 (or independent processor of interfaces 210) to perform functions relating to the techniques described herein.

Figure 4A:
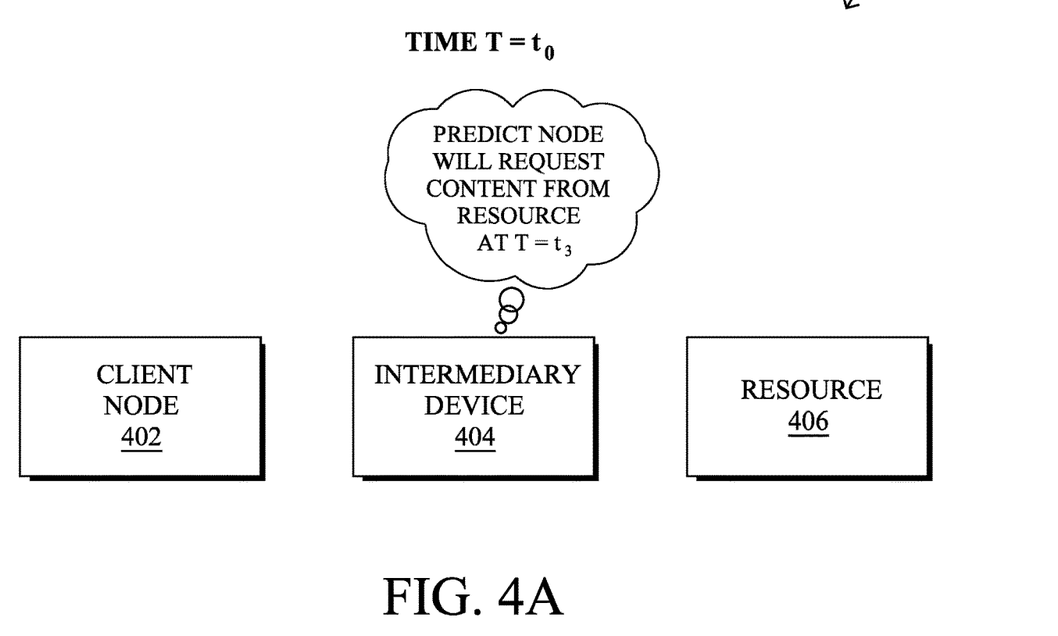
FIGS. 4A-4D illustrate an example of a device making a security assessment of prefetched content.

Operationally, FIGS. 4A-4D illustrate an example 400 of a device making a security assessment of prefetched content, according to various embodiments. As shown in FIG. 4A, assume that there exists a particular client node 402 that has requested content from resource 406 any number of times previously. Further, assume that intermediary device 404 is located along the communication pathway between client node 402 and resource 406. During operation, intermediary device 404 may capture information regarding the attempt(s) of client node 402 to retrieve content from resource 406. For example, intermediary device 404 may capture information regarding the addresses, ports, universal resource indicator (URI), protocols, timing information (e.g., when the content was requested), etc., of the traffic flows(s) associated with the content request(s).

In general, client node 402 may be any form of client electronic device. For example, client node 402 may be a desktop computer, laptop computer, tablet computer, mobile phone, wearable device (e.g., smart watch, heads up display, etc.), IoT node, or any other form of device in the network. Similarly, resource 406 may be any form of online service that responds with traffic data in response to a request. For example, resource 406 may be a website that provides webpage content, an online application that provides application content, or the like, to client node 402.

Intermediary device 404 may be any form of intermediary between client node 402 and resource 406 in the network. For example, intermediary device 404 may be a router, switch, server, IDS, IPS, firewall, Netflow™ or IPFIX exporter, or the like, located along the network path between client node 402 and resource 406. As would be appreciated, the functions described herein with respect to intermediary device 404 may be performed by a plurality of devices, in further embodiments. For example, in one implementation, intermediary device 404 may represent an IDS that operates in conjunction with one another to perform the functions herein. In such cases, the two devices may be viewed as a collective device that implements the techniques herein.

According to various embodiments, intermediary device 404 may generate a machine learning-based traffic model that models the traffic and/or content requests associated with client node 402. For example, intermediary device 404 may use the captured traffic information regarding flows to and/or from client node 402, to generate and train the model to predict future traffic associated with client node 402. Any suitable form of machine learning model may be used to predict the future traffic. For example, intermediary device 404 may train a time series model to predict future traffic associated with client node 402, based on the traffic information captured regarding one or more prior attempts by client node 402 to retrieve content from resource 406.

In one embodiment, the machine learning-based model of intermediary device 404 may be operable to predict a time at which client node 402 is next expected to attempt to retrieve content from resource 406. In further embodiments, the model may be operable to output the set of most probable content that will need to be inspected at a certain time or within a predefined timespan. This may include, for example, the frequency of the visit or interaction, the reputation of the website or service, the reputation of the requesting user, the category of the content (e.g., file, data, cookie, etc.), the time needed to inspect the traffic, the system load at the time (e.g., a long list or short list), combinations thereof, or the like. By way of example, assume that at time $T=t_0$, the model of intermediary device 404 predicts that client node 402 will request future webpage content from resource 406 at time $T=t_3$.

Figure 4B:
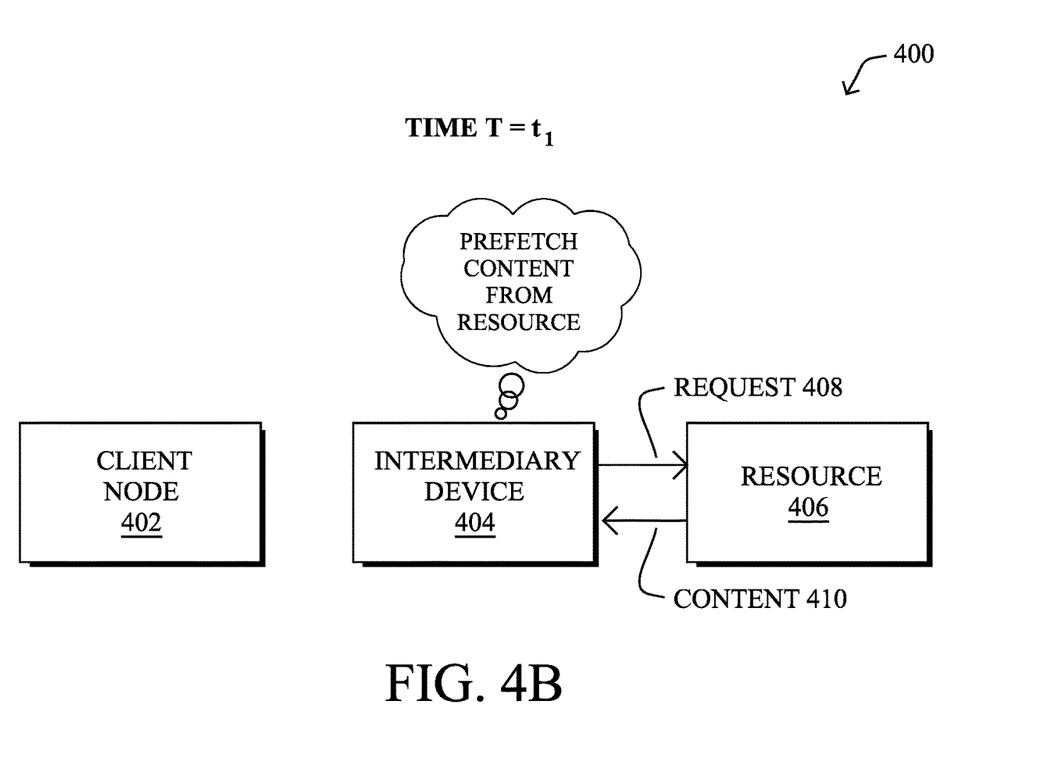

As shown in FIG. 4B, prior to the predicted time at which client node 402 is expected to attempt to retrieve content from resource 406, intermediary device 404 may cause the content to be prefetched. For example, if client node 402 is predicted to attempt to retrieve content from resource 406 at time $T=t_3$, intermediary device 404 may itself issue a request 408 for the content at an earlier time, $T=t_1$. In response, resource 406 may send the requested content 410 to intermediary device 404.

In various embodiments, intermediary device 404 may coordinate the prefetching of content 410 with a cache engine in the network. Generally, such cache engines may already be operable to prefetch and/or retain content in the local network. For example, if intermediary device 404 is, or includes, an IDS or other security service, the security service may instruct a cache engine to prefetch and retain content 410 (e.g., by issuing a request 408 to resource 406). In turn, the cache engine may make content 410 available to the security service for inspection.

Figure 4C:
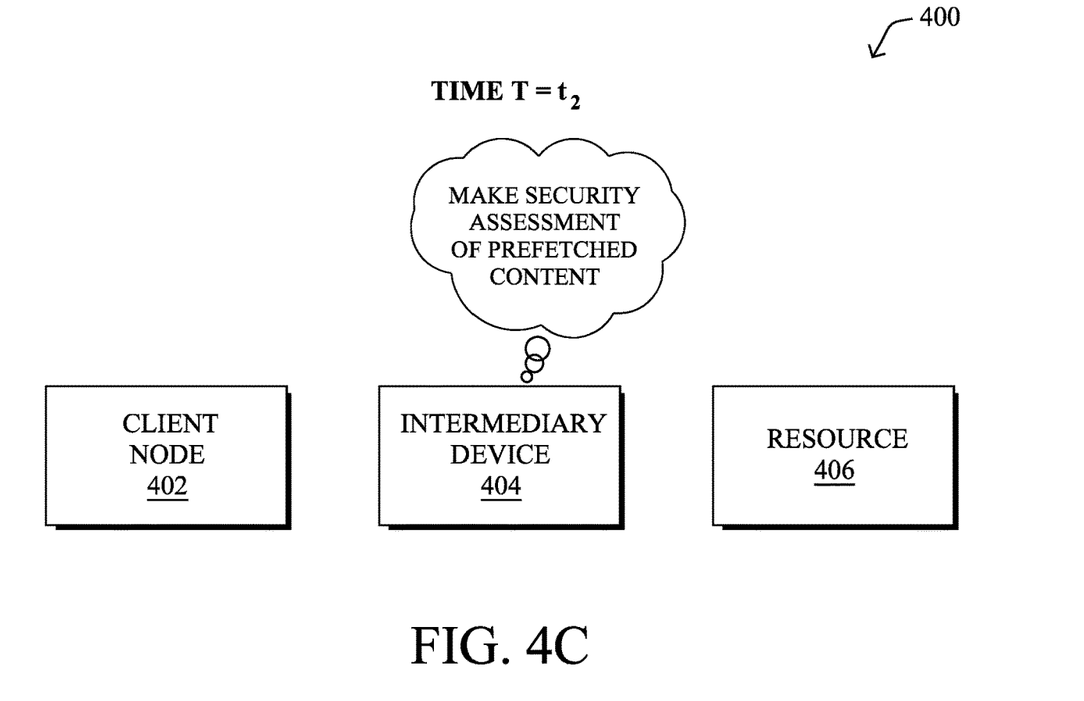

In FIG. 4C, at time $T=t_2$ (e.g., prior to when client node 402 is expected to request content from resource 406), intermediary device 404 may make a security assessment of the prefetched content 410. Such an assessment may include, for example, an assessment as to whether content 410 is malicious. For example, intermediary device 404 may determine whether content 410 includes malware, is part of a phishing attempt, is attempting to exfiltrate data from the local network, etc. In some embodiments, this determination may also entail executing content 410 in a sandbox environment, to determine whether content 410 is malware.

In further cases, the security assessment may determine whether client node 402 and/or the user of client node 402 is authorized to access content 410. Notably, only certain users may be authorized to access certain websites or applications by policy, content deemed offensive may be blocked by policy, etc. For instance, if content 410 is a Flash™ game, based on the policy, some of the users may be able to access it, but some may not. In this case, prefetching and inspecting content 410 beforehand also provides other benefits. In particular, this allows content 410 to be cached together with the inspection verdicts tags (e.g., indicating that the file is a Flash™ game), which can be used to speed up the enforcement of the security policies when the content is actually requested by a user.

The security service may also share its security assessment of content 410 with the cache engine, if a cache engine is used. For example, the cache engine may only cache content 410 if the content is deemed acceptable for client node 402 and/or the user of client node 402. In turn, when client node 402 issues a request for the content from resource 406, the cache engine may supply content 410 to client node 402 directly. Conversely, if the security service deems content 410 to be unacceptable, the cache engine may remove content 410 from its memory and the security service can block the incoming request for the content from client node 402.

Figure 4D:
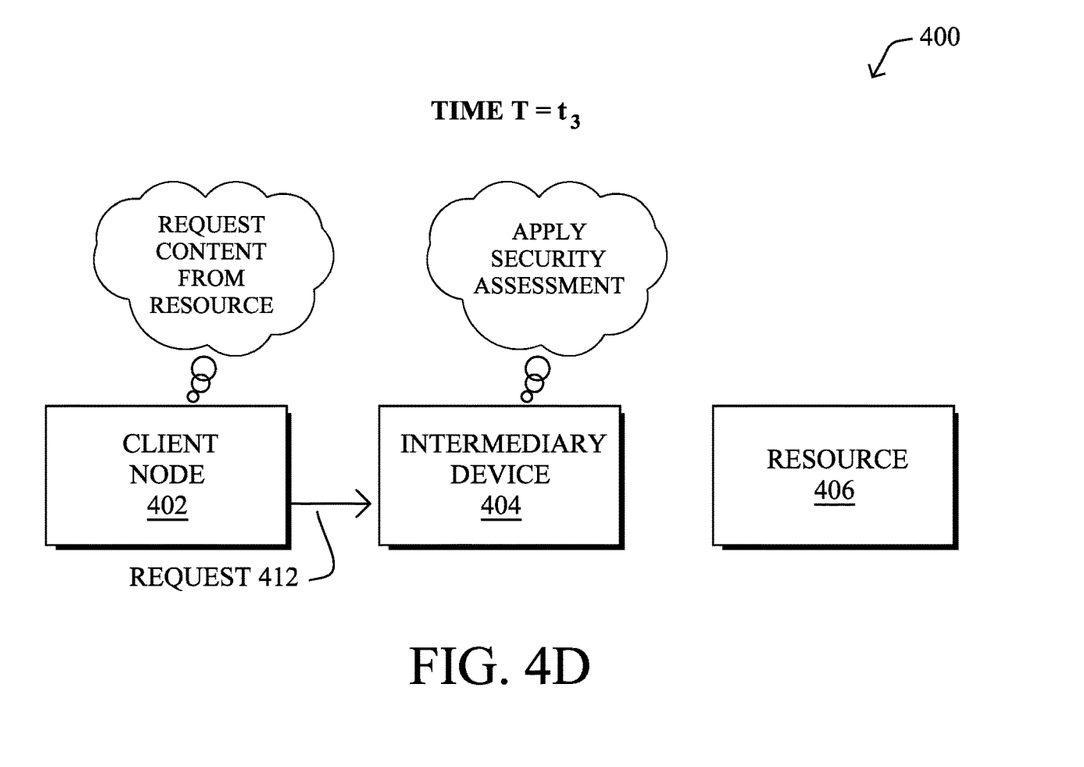

In FIG. 4D, at the predicted time $T=t_3$, client node 402 may send a request 412 for content towards resource 406 and via intermediary device 404. In various embodiments, intermediary device 404 may then apply its security assessment of the prefetched content 410 at this time. If node 402 and/or the user of node 402 is allowed to receive the content from resource 406, intermediary device 404 may allow request 412 to continue to resource 406, thereby allowing client node 402 to receive the content. Similarly, if a cache engine is used and node 402 and/or the user of node 402 is authorized based on the security assessment, the cache engine may simply provide the content to client node 402 directly.

In another embodiment, intermediary device 404 may allow request 412 to continue to resource 406 and inspect the resulting content from resource 406 before allowing node 402 to receive the content. For example, intermediary device 404 may compare the content to the prefetched content 410, to ensure that the security assessment of prefetched content 410 is still applicable. If not, intermediary device 404 may still make a security assessment on the most recently received content, either by inspecting the full content or the deltas with the prefetched content 410.

If the security assessment of the prefetched content 410 is negative, intermediary device 404 may initiate any number of mitigation actions in the network. For example, intermediary device 404 may prevent client node 402 from receiving the requested content, may send one or more alerts indicative of the blocked content (e.g., to client node 402, to a network administrator, etc.), and/or other mitigation actions.

By way of specific example of the techniques herein, if the user of client node 402 typically goes to cnn.com every day at 9:00 AM when she arrives at work, the model of intermediary device 404 may learn this behavior from the corresponding traffic and predict that she will again visit cnn.com at 9:00 on the following day. In turn, and in advance of the predicted attempt to access cnn.com (e.g., at 8:55 AM the next day), intermediary device 404 may prefetch the content and make a security assessment of the content. If, for example, some malicious content was added to cnn.com at 8:50 AM, the prefetch mechanism will detect that the content has changed and may send the content to a sandbox for analysis. This then affords intermediary device 404 a five minute period to analyze the content before client node 402 actually requests it. If the content appears to be malicious, intermediary device 404 can then block client node 402 from receiving the content when client node 402 actually requests the content. This is in sharp contrast to many security systems that would otherwise allow the content to go through.

Various parameters can also be used to control the operation of intermediary device 404, either as configurable parameters or hardcoded parameters. For example, one parameter may control the timespan between when intermediary device 404 causes the content to be prefetched and when client node 402 is predicted/expected to actually request the content. This parameter may also be an output of the traffic model which can also take into account the amount of time needed to inspect the content (e.g., an executable file may take longer to inspect than an image, etc.).

Another parameter may control how repeated connections within a certain time frame are treated. For example, the model may output a parameter that causes only one of the connections to undergo deep inspection, while subsequent connections only undergo lightweight inspection (e.g., to reduce the workload during peak times). Say, e.g., there is a large volume of connections that all download the same image around 11:00 AM. In such a case, the parameter may control whether each connection is to receive the same security assessment or whether some of the connections can undergo a more lightweight assessment. A similar parameter may even control when the prefetch mechanism is even enabled, such as a function of the expected traffic load in the network (e.g., to enable the prefetch assessments when traffic is expected to be high).

Figure 5:
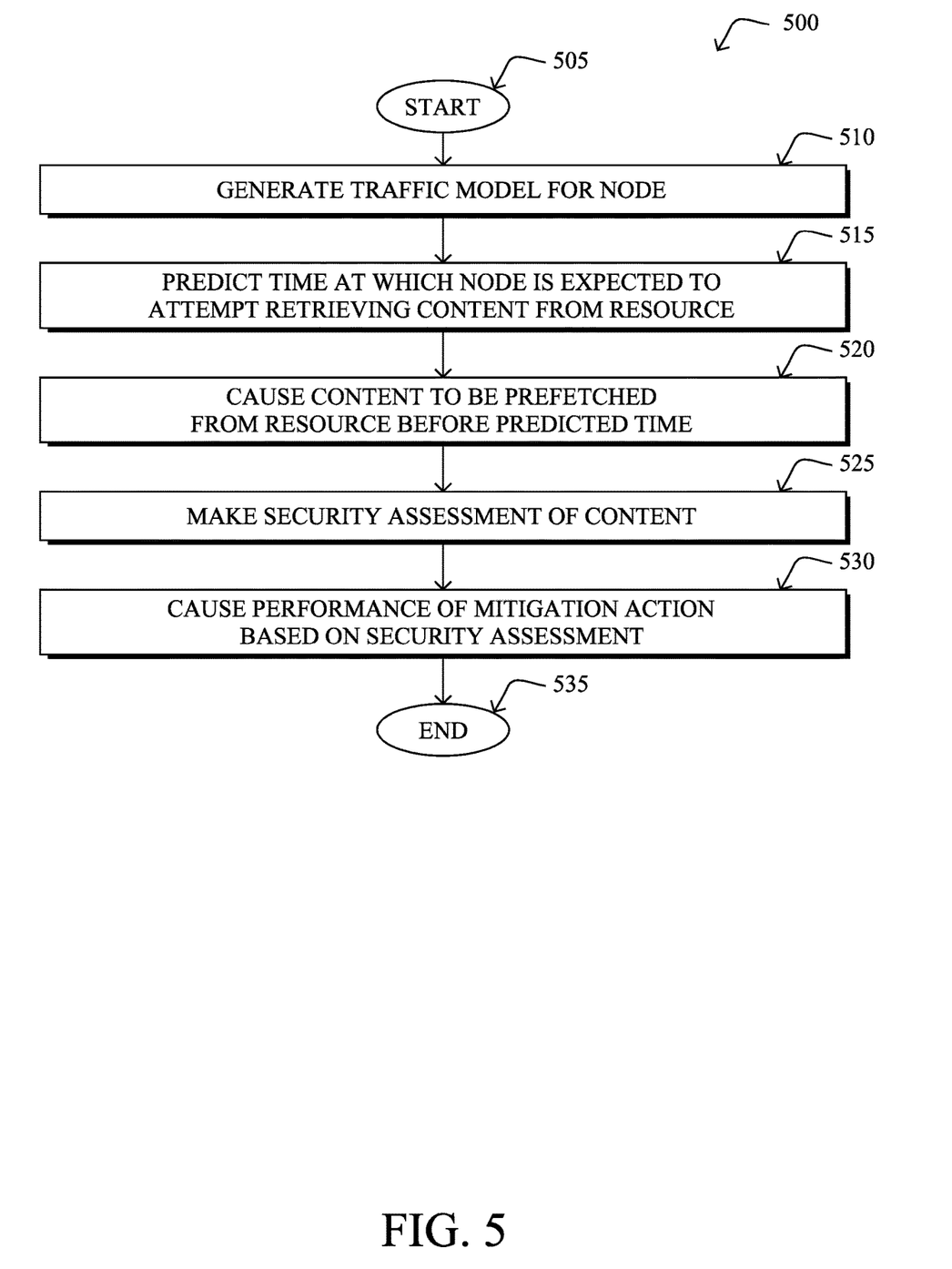
FIG. 5 illustrates an example simplified procedure for making a security assessment of prefetched content.

FIG. 5 illustrates an example simplified procedure for making a security assessment of prefetched content, in accordance with various embodiments herein. For example, a non-generic, specifically configured device (e.g., device 200) may perform procedure 500 by executing stored instructions (e.g., process 248). The procedure 500 may start at step 505, and continues to step 510, where, as described in greater detail above, the device may generate a machine learning-based traffic model. For example, the device may generate a traffic model for a particular node using data indicative of the particular node in the network attempting to retrieve content from a particular resource in the network.

At step 515, as detailed above, the device may predict, using the traffic model, a time at which the particular node is expected to attempt retrieving future content from the particular resource. In general, the machine learning-based traffic model may predict when the node is next expected to request content from the resource, based on the prior requests make from the node to the resource. The traffic model may also take into account content requests from any number of nodes in the network to any number of resources. For example, the model may output a list of resources from which content is expected to be requested within a certain timespan.

At step 520, the device may cause the future content from the particular resource to be prefetched in the network prior to the predicted time, as described in greater detail above. Generally, future content refers herein to content that a node has not actually requested, yet, but is expected to be requested by the node. In some embodiments, the device may itself prefetch the content by sending a request to the resource for the content. In other embodiments, the device may send an instruction to a cache engine, to prefetch the content on behalf of the device. When the prefetch occurs may also be based on a parameter, such as a predefined timespan prior to when the particular node is expected to attempt to access the content. For example, in the case of an executable file, the device may cause the content to be prefetched with enough time to execute the file in a sandbox environment and determine whether the file is malicious.

At step 525, as detailed above, the device may make a security assessment of the prefetched content. In general, the security assessment may determine whether the particular node is authorized to access/receive the content from the resource. For example, the assessment may be based on the user associated with the node, the node itself, the type of content, etc. In many cases, the security assessment may determine whether the prefetched content is malicious. For example, the security assessment may entail executing a prefetched file in a sandbox environment, to determine whether the file comprises malware. In further cases, the security assessment may enforce one or more access policies. For example, the assessment may indicate that one user is authorized to access the content, while another user in the network is not authorized to access the content (e.g., based on the type of content).

At step 530, the device may cause the performance of a mitigation action in the network, as described in greater detail above. Such a mitigation action may be based on the security assessment of the prefetched content and in response to the particular node attempting to retrieve the future content from the particular resource. For example, if the node attempts to retrieve a webpage from a website and the device determined that the prefetched form of the webpage includes malware, the device may block the node from accessing the webpage. In further cases, the mitigation action may entail generating an alert indicative of the security assessment. For example, the device may notify the user that the request was blocked because the webpage includes malware, is prohibited by policy, etc. Procedure 500 then ends at step 535.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, leverage machine learning to prefetch and analyze content before a node in the network actually attempts to access the content. In some aspects, the techniques help to minimize the possibility of zero day threats passing through a security mechanism, such as an IDS/IPS. Notably, the techniques herein allow the security mechanism to perform deeper inspection of the content in advance of when the content is actually requested. For example, a conventional firewall may not have enough time to fully assess the content in real time based on the 5-tuple information.

In further aspects, the techniques herein improve the performance of the security mechanism. For example, by learning the history of user data, the security device may know at certain time (e.g., 11:00 AM in the morning) that the traffic will be peak and may oversubscribe the device. However, the peak traffic may have many repeated patterns, such as when multiple users access the same website, or different users download the same image. In such cases, the techniques herein can be used to consolidate security assessments of the content (e.g., by performing heavy inspection of the content only once), in contrast to current systems that inspect each attempt to access of the content separately.

While there have been shown and described illustrative embodiments that provide for performing a prefetch assessment of content, it is to be understood that various other adaptations and modifications may be made within the spirit and scope of the embodiments herein. For example, while certain embodiments are described herein with respect to using certain machine learning models for purposes of predicting user traffic, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
generating, by a device in a network, a machine learning-based traffic model using data indicative of a particular node in the network attempting to retrieve content from a particular resource in the network, wherein the particular node is one of a plurality of devices in the network, wherein the device is an intermediate device in the network between the particular node and the particular resource;
predicting, by the device and using the traffic model, a time at which the particular node is expected to attempt retrieving future content from the particular resource;
in response to predicting the time by the traffic model, causing, by the device, the future content from the particular resource to be prefetched in the network prior to the predicted time, wherein the device causes the future content to be prefetched from the particular resource based in part on a predicted traffic load in the network that is expected to occur within a predefined timespan of the predicted time;
making, by the device, a security assessment of the prefetched content;
receiving, at the device, a request from the particular node to retrieve the future content from the particular resource; and
in response to the request, causing, by the device, performance of a mitigation action in the network based on the security assessment of the prefetched content, wherein when a user associated with the request is allowed to receive the future content, the mitigation action allows the request to continue to the particular resource, and wherein when the user associated with the request is not allowed to receive the future content, the mitigation action prevents the request from being sent to the particular resource.

2. The method as in claim 1, wherein the resource comprises a website and the future content comprises webpage data.

3. The method as in claim 1, wherein the mitigation action further includes generating an alert indicative of the security assessment.

4. The method as in claim 1, further comprising:
receiving, at the device, a parameter indicative of when the future content should be prefetched from the particular resource.

5. The method as in claim 1, further comprising:
in response to a second node in the network attempting to retrieve the future content from the particular resource within the predefined timespan of the predicted time, performing a different mitigation action.

6. The method as in claim 1, wherein the security assessment of the prefetched content comprises an indication of a first user being authorized to access the prefetched content and an indication of a second user being unauthorized to access the prefetched content.

7. The method as in claim 1, further comprising:
capturing, by the device, the data indicative of the particular node in the network attempting to retrieve content from the particular resource in the network.

8. The method as in claim 7, wherein capturing the data indicative of the particular node in the network attempting to retrieve content form the particular resource comprises:

intercepting, by the device, an encrypted communication from the particular node or from the particular resource that is indicative of the content.

9. An apparatus, comprising:
one or more network interfaces to communicate with a network;
a processor coupled to the network interfaces and configured to execute one or more processes; and
a memory configured to store a process executable by the processor, the process when executed configured to:
generate a machine learning-based traffic model using data indicative of a particular node in the network attempting to retrieve content from a particular resource in the network, wherein the particular node is one of a plurality of devices in the network, wherein the device is an intermediate device in the network between the particular node and the particular resource;
predict, using the traffic model, a time at which the particular node is expected to attempt retrieving future content from the particular resource;
in response to predicting the time by the traffic model, cause the future content from the particular resource to be prefetched in the network prior to the predicted time, wherein the future content is prefetched from the particular resource based in part on a predicted traffic load in the network that is expected to occur within a predefined timespan of the predicted time;
make a security assessment of the prefetched content;
receive a request from the particular node to retrieve the future content from the particular resource; and
in response to the request, cause performance of a mitigation action in the network based on the security assessment of the prefetched content, wherein when a user associated with the request is allowed to receive the future content, the mitigation action allows the request to continue to the particular resource, and wherein when the user associated with the request is not allowed to receive the future content, the mitigation action prevents the request from being sent to the particular resource.

10. The apparatus as in claim 9, wherein the resource comprises a website and the future content comprises webpage data.

11. The apparatus as in claim 9, wherein the mitigation action further includes generating an alert indicative of the security assessment.

12. The apparatus as in claim 9, wherein the process when executed is further configured to:
receive a parameter indicative of when the future content should be prefetched from the particular resource.

13. The apparatus as in claim 9, wherein the process when executed is further configured to:
in response to a second node in the network attempting to retrieve the future content from the particular resource within the predefined timespan of the predicted time, performing a different mitigation action.

14. The apparatus as in claim 9, wherein the security assessment of the prefetched content comprises an indication of a first user being authorized to access the prefetched content and an indication of a second user being unauthorized to access the prefetched content.

15. The apparatus as in claim 9, wherein the apparatus makes the security assessment of the prefetched content by:
executing the prefetched content in a sandbox environment.

16. The apparatus as in claim 15, wherein the apparatus captures the data indicative of the particular node in the network attempting to retrieve content form the particular resource by:
intercepting an encrypted communication from the particular node or from the particular resource that is indicative of the content.

17. A tangible, non-transitory, computer-readable medium storing program instructions that cause a device in a network to execute a process comprising:
generating, by the device, a machine learning-based traffic model using data indicative of a particular node in the network attempting to retrieve content from a particular resource in the network, wherein the particular node is one of a plurality of devices in the network, wherein the device is an intermediate device in the network between the particular node and the particular resource;
predicting, by the device and using the traffic model, a time at which the particular node is expected to attempt retrieving future content from the particular resource;
in response to predicting the time by the traffic model, causing, by the device, the future content from the particular resource to be prefetched in the network prior to the predicted time, wherein the device causes the future content to be prefetched from the particular resource based in part on a predicted traffic load in the network that is expected to occur within a predefined timespan of the predicted time;
making, by the device, a security assessment of the prefetched content;
receiving, at the device, a request from the particular node to retrieve the future content from the particular resource; and
in response to the request, causing, by the device, performance of a mitigation action in the network based on the security assessment of the prefetched content, wherein when a user associated with the request is allowed to receive the future content, the mitigation action allows the request to continue to the particular resource, and wherein when the user associated with the request is not allowed to receive the future content, the mitigation action prevents the request from being sent to the particular resource.

18. The computer-readable medium as in claim 17, wherein the process further comprises:
in response to a second node in the network attempting to retrieve the future content from the particular resource within the predefined timespan of the predicted time, performing a different mitigation action.

19. The tangible, non-transitory, computer-readable medium as in claim 17, wherein the security assessment of the prefetched content comprises an indication of a first user being authorized to access the prefetched content and an indication of a second user being unauthorized to access the prefetched content.

20. The tangible, non-transitory, computer-readable medium as in claim 17, further comprising:
intercepting, by the device, an encrypted communication from the particular node or from the particular resource.

* * * * *